United States Patent [19]
Anderson, Jr.

[11] 3,749,954
[45] July 31, 1973

[54] BEARING CAP FOR ELECTRIC MOTOR

[75] Inventor: Gordon R. Anderson, Jr., Roscoe, Ill.

[73] Assignee: Airtrol Corporation, Rockton, Ill.

[22] Filed: Aug. 23, 1972

[21] Appl. No.: 283,190

[52] U.S. Cl................. 310/90, 308/132, 308/134.1
[51] Int. Cl. .............................................. H02k 5/16
[58] Field of Search........................ 310/90, 67, 72; 308/132, 134.1, 163; 184/64, 102

[56] References Cited
UNITED STATES PATENTS

| | | | |
|---|---|---|---|
| 3,626,221 | 12/1971 | Anderson | 310/90 |
| 3,663,849 | 5/1972 | Hoeb | 310/163 |
| 3,387,153 | 6/1968 | Grad | 310/90 |
| 3,513,339 | 5/1970 | Harris | 310/90 |

Primary Examiner—R. Skudy
Attorney—C. Frederick Leydig, Michael C. Payden et al.

[57] ABSTRACT

A unit bearing motor is provided with a vented bearing cap which allows air to escape to the atmosphere as the cap is telescoped into a bearing housing.

9 Claims, 8 Drawing Figures

PATENTED JUL 31 1973

3,749,954

BEARING CAP FOR ELECTRIC MOTOR

BACKGROUND OF THE INVENTION

This invention relates to an electric motor and, more particularly, to an electric motor of the type having a pair of axially spaced shaft bearings which are telescoped into a bearing housing carried by a rotor and which rotate on a stationary shaft projecting cantilever fashion from a stator assembly. The bearings are made of porous material and are adapted to be permanently lubricated by an oil impregnated liner telescoped into the bearing housing and over the shaft and sandwiched between the opposing inboard faces of the bearings. A motor of this general type is disclosed in Anderson et al. U.S. Pat. No. 3,626,221.

In the present motor, the bearings and the bearing housing are captivated axially on the shaft by a retaining ring fastened to the outer end of the shaft and by a thrust disc located to abut the end of the shaft. The thrust disc is retained within a bearing cap adapted to be assembled telescopically with the outer end of the bearing housing. As a result of the telescopic fit between the bearing cap and the bearing housing, the retaining ring is disposed within a chamber defined between the thrust disc and the outer bearing.

SUMMARY OF THE INVENTION

The general aim of the present invention is to avoid the formation of a pressurized air cushion in the chamber during telescopic assembly of the bearing housing and the bearing cap and preferably to maintain the air in the chamber at atmsopheric pressure during the service life of the motor. By eliminating the air cushion and keeping the chamber at atmospheric pressure, the rotor is allowed to run at its magnetic center to reduce endwise thrusting of the rotor against the retaining ring and thereby avoid excessive noise and "end bump" while at the same time reducing the frictional drag on the rotor.

A more detailed object is to achieve the foregoing by venting the chamber to the atmosphere through the bearing cap so that air can escape from the chamber as the cap is assembled telescopically with the bearing housing.

The invention also resides in the unique manner of venting the chamber and restricting the escape of lubricating oil from the vented chamber.

These and other objects and advantages of the invention will become more apparent from the following detailed description when taken in conjunction with the accompanying drawings.

DETAILED DESCRIPTION OF THE PREFERRED EMBODIMENTS

Figure 1:
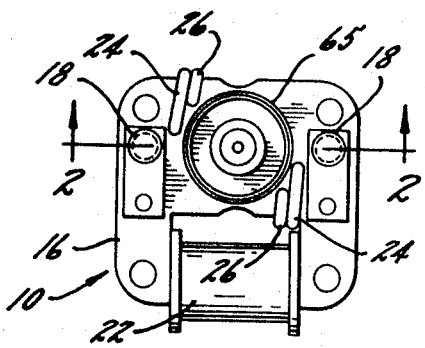
FIG. 1 is a front elevation of a new and improved electric motor incorporating the novel features of the present invention.

As shown in the drawings for purposes of illustration, the invention is embodied in a shaded-pole motor 10 generally comprising a cylindrical rotor 11 journaled for rotation on a cantilevered shaft 13 rigid with and projecting outwardly from the frame bracket 14 of a stator assembly. The frame bracket supports a field core 16 which is formed by sets of stacked laminations secured to the bracket by pins 18 and defining a cylindrical opening 20 within which the rotor is disposed. Wrapped around a portion of the stator is a primary winding 22 adapted for connection to a source of alternating current voltage, and placed in selected positions in the stator are the usual shading coils 24 and 26.

Figure 2:
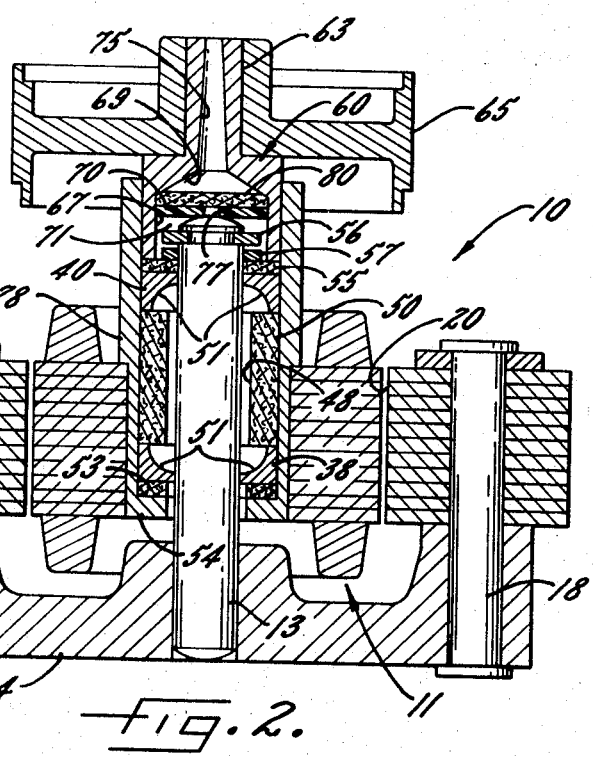
FIG. 2 is an enlarged cross-section taken substantially along the line 2—2 of FIG. 1.

The rotor 11 includes a central tubular bearing housing 28 (FIG. 2) press-fitted into a series of stacked sheet metal stampings which coact with a plurality of conductors (not shown) to form the secondary winding of the motor. Alternatively, the housing 28 may be formed as an integral part of the secondary winding of the motor. As shown in FIG. 2, the housing is telescoped onto the shaft 13 and is supported thereon by inner and outer axially spaced bearings 38 and 40 which are press-fitted into the housing and received rotatably on the shaft with a running fit so that the rotor 11 thus can turn freely on the shaft.

Formed between the bearings 38 and 40 is a chamber 48 (FIG. 2) adapted to hold a quantity of oil for lubricating the bearings during the entire service life of the motor. A tubular liner 50 of felt or other absorbent material for conducting oil to the bearings is disposed within the chamber with its ends contacting the inboard faces of the bearings. The liner is pressed into the bearing housing 28 and is telescoped loosely over the shaft 13 so as to leave the rotor 11 free to turn without being retarded as a result of frictional contact of the liner with the shaft. The bearings are made of sintered metal and are somewhat porous so that oil delivered to the bearings by the liner may work its way through the bearings to lubricate the shaft between the latter and the bearings and thus reduce wear and running friction. Slots 51 are formed in the bearings and restrict the escape of oil past the bearings in the manner disclosed in my copending application Ser. No. 241,703, filed Apr. 16, 1972.

Located adjacent the outboard face of the inner bearing 38 and pressed into the housing 28 is a felt ring 53 (FIG. 2) which abuts an annular flange 54 extending around the inner end of the housing, the flange serving to captivate the inner bearing within the housing. A similar felt ring 55 is disposed adjacent the outboard face of the outer bearing 40 while a metal snap ring 56 is fastened to the outer end portion of the shaft 13 to captivate the rotor 11 against outward movement off of the shaft. Telescoped loosely over the shaft and sandwiched between the felt ring 55 and the snap ring 56 is a thrust washer 57 which is made of nylon or the like to reduce friction between the felt ring and the snap ring.

As shown in FIG. 2, a cylindrical bearing cap 60 is telescoped into the outer end portion of the housing 28 with a press fit and carries an arbor 63 adapted to support a device such as the hub 65 of a fan blade (not shown) which is to be driven by the motor 10. In this instance, the arbor is formed integrally with the bearing cap.

The inner end portion of the bearing cap 60 is formed with a cylindrical opening 67 having a conical end wall 69. Disposed in the opening and backed by the wall 69 is a nylon thrust disc 70 which abuts the outer end of the shaft 13 to limit movement of the rotor 11 inwardly along the shaft. As shown in FIG. 2, a chamber 71 is defined between the thrust disc 70 and the felt ring 55 and such chamber contains the snap ring 56 and the thrust washer 57.

In assembling the motor 10, the felt ring 53, the inner bearing 38, the oil liner 50, the outer bearing 40 and the felt ring 55 are all pressed into the bearing housing 28 in stacked relation and then the entire assembly is telescoped onto the shaft 13. After the thrust washer 57 and the snap ring 56 have been installed on the shaft the bearing cap 60 (with the thrust disc 70 therein) is press-fitted into the outer end of the bearing housing. As an incident to pressing the cap into the housing, the air in the chamber 71 becomes compressed and tends to form a pressurized air cushion within the chamber since the cap acts like a piston as it is slid into the housing.

According to the present invention, provision is made of a passage 75 (FIG. 2) which vents the chamber 71 to the atmosphere as the bearing cap 60 is telescoped into the bearing housing 28 so that the air being compressed in the chamber may escape to avoid the formation of a pressurized air cushion in the chamber. In the preferred embodiment, the passage also vents the chamber continuously during the life of the motor 10 and thus changes in atmospheric pressure will not cause a build up of pressure or vacuum within the chamber. As a result of venting the chamber, the latter is free of any air cushion which otherwise would cause the rotor 11 to run off of its magnetic center and thrust outwardly against the snap ring 56. Excessive bumping of the rotor against the snap ring thus is avoided so as to reduce noise and decrease friction during operation of the motor.

In the preferred embodiment shown in FIG. 2, the passage 75 extends axially through the center of the arbor 63 and the end cap 60 and communicates with the chamber 71 through a small hole 77 formed through the center of the thrust disc 70. Preferably, the passage tapers gradually upon progressing outwardly from the conical wall 69 to the outer end of the arbor. To restrict the escape of oil through the passage, a seal in the form of a felt disc 80 is sandwiched between the wall 69 and the thrust disc 70 and is disposed in face-to-face relation with the outer face of the thrust disc to cover the hole 77. While restricting the escape of oil through the hole 77, the felt disc 80 is sufficiently porous to allow air to flow through the hole from the chamber 71 and thence into the passage 75.

With the foregoing arrangement, air in the chamber 71 can escape through the hole 77 and the passage 75 when the end cap 60 is press-fitted into the bearing housing 28 during assembly of the motor 10. In addition, the chamber is vented continuously during the service life of the motor so that the air in the chamber remains at atmospheric pressure at all times. When the motor is running, centrifugal force spins any free oil in the chamber toward the inner circumferential wall of the opening 67 in the end cap and prevents leakage of such oil through the hole 77 and the passage 75. When the motor is not operating, the felt disc 80 restricts the escape of oil through the hole and the passage. Because the passage is tapered, any residual free oil which does escape into the passage is pumped back into the felt disc 80 by centrifugal force when the motor is initially started up.

Figure 3:
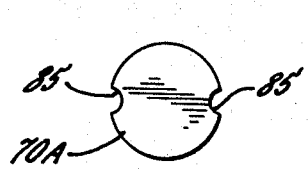
FIG. 3 is a front elevation of a modified thrust disc.

FIG. 3 shows an alternative form which the thrust disc may take, the disc being indicated by the reference numeral 70A. In this case, two diametrically spaced notches 85 are formed in the peripheral edge of the disc to establish communication between the chamber 71 and the passage 75.

Figure 4:
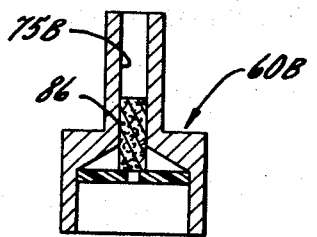
FIGS. 4, 5 and 6 are cross-sectional views showing three different embodiments of bearing caps.
Figure 5:
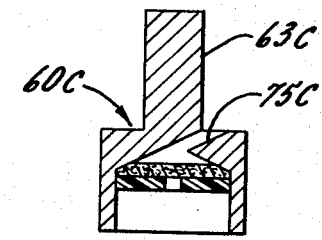

In the embodiment shown in FIG. 4, the passage 75B through the bearing cap 60B is cylindrical and is closed off by a cylindrical felt plug 86 telescoped into the passage, the plug serving the same purpose as the felt disc 80. FIG. 5 shows a bearing cap 60C with a slanted passage 75C which opens out of the end of the body of the cap rather than extending through the arbor 63C.

Figure 6:
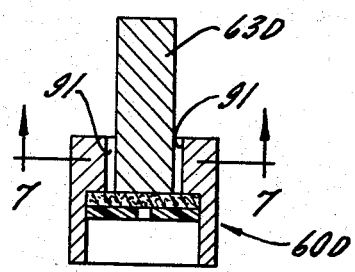
Figure 7:
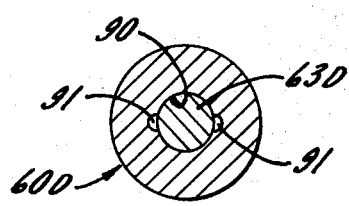
FIG. 7 is a cross-section taken along the line 7—7 of FIG. 6.

Another version of the invention is shown in FIGS. 6 and 7. In this instance, the arbor 63D is formed separately of the main body of the bearing cap 60D and is press fitted into a hole 90 extending through the body. Diametrically spaced groove 91 are formed in the wall of the hole 90 to establish communication between the chamber 71 and the outside atmosphere and thereby vent the chamber. In place of the grooves 91, one or more grooves could be formed in the outer surface of the arbor 63D.

Figure 8:
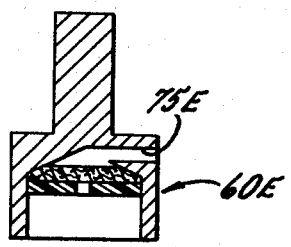
FIG. 8 is a cross-sectional view of still another embodiment of a unique bearing cap constructed in accordance with the invention.

In the embodiment shown in FIG. 8, a vent passage 75E extends radially through the main body of the bearing cap 60E. As the bearing cap is telescoped into the housing 28, the passage 75E initially vents the chamber 71 but then is covered up when the bearing cap is fully seated. With this arrangement, there is no danger at all of oil escaping through the passage but the chamber is vented only during assembly and not during continuous operation of the motor.

I claim as my invention:

1. An electric motor having a stator assembly with a stationary shaft cantilevered thereon and projecting outwardly therefrom, a rotor having a centrally located tubular bearing housing telescoped over said shaft, inner and outer axially spaced sleeve bearings of porous material fixed within said housing and rotatable on said shaft, an oil-impregnated tubular liner telscoped into said housing and over said shaft and sandwiched between the inboard faces of said bearings, a retaining ring fastened to the outer end portion of said shaft to captivate said housing and said bearings on said shaft, and a bearing cap telescoped into the outer end portion of said housing with a press fit and closing off the outer end portion of the housing, said bearing cap having an opening in its inner end for receiving the outer end portion of said shaft, the improvement in said motor comprising, a thrust disc disposed within said opening between the outer wall thereof and the outer end of said shaft and defining the outer wall of a chamber which encloses said retaining ring, a hole extending through said thrust disc and communicating with said chamber, a passage formed in said bearing cap and communicating with said hole, said passage also communicating with the atmosphere to vent said chamber to the atmosphere and thereby prevent the formation of an air cushion in said chamber, and an absorbent seal of porous material disposed in said opening between said thrust disc and said passage and covering said hole to restrict the escape of oil through the hole and into the passage 2. An electric motor as defined in claim 1 in which said pasage is centered relative to the axis of said shaft and opens out of the outer end of said bearing cap.

3. An electric motor as defined in claim 2 in which said passage tapers gradually upon progressing toward the outer end of said bearing cap.

4. An electric motor as defined in claim 2 in which said seal comprises a felt plug telescoped into said passage and located with its inner end abutting the outer surface of said thrust disc and covering said hole.

5. An electric motor as defined in claim 1 in which said seal comprises a felt disc disposed in face-to-face relation with the outer surface of said thrust disc.

6. An electric motor having a stator assembly with a stationary shaft cantilevered thereon and projecting outwardly therefrom, a rotor having a centrally located tubular housing member telescoped over said shaft, inner and outer axially spaced bearings fixed within said housing and rotatable on said shaft, a retaining ring fastened to the outer end portion of said shaft to hold said housing and said bearings on the shaft, and a cap member assembled telescopically with the outer end portion of said housing with a press fit and closing off the outer end portion of the housing whereby said retaining ring is disposed within a chamber defined in said housing between said cap and said outer bearing, the improvement in said motor comprising, passage means formed in one of said members and communicating with said chamber, said passage means also communicating with the atmosphere at least during telescopic assembly of said cap member with said bearing member thereby to vent said chamber to the atmosphere and avoid the formation of an air cushion in said chamber.

7. An electric motor as defined in claim 6 in which said cap is telescoped into said housing, said passage means being formed in said cap.

8. An electric motor as defined in claim 7 in which said passage means establish communication between said chamber and the atmosphere only during telescopic assembly of said cap into said housing, the outer end of said passage means being closed off by said housing after telescopic assembly of said cap into said housing.

9. An electric motor as defined in claim 7 in which said passage means establish communication between said chamber and the atmosphere both during and after telescopic assembly of said cap into said housing, the outer end of said passage means remaining open to the atmosphere after telescopic assembly of said cap into said housing.

* * * * *